(12) United States Patent
Zadeh et al.

(10) Patent No.: US 8,441,166 B2
(45) Date of Patent: May 14, 2013

(54) DEVICE FOR CONNECTING TOGETHER END WINDING PARTS OF STATOR

(75) Inventors: Hossein Safari Zadeh, Othmarsingen (CH); Damir Novosel, Möriken (CH)

(73) Assignee: ALSTOM Technology Ltd., Baden (CH)

( * ) Notice: Subject to any disclaimer, the term of this patent is extended or adjusted under 35 U.S.C. 154(b) by 171 days.

(21) Appl. No.: 13/033,691

(22) Filed: Feb. 24, 2011

(65) Prior Publication Data

US 2011/0215663 A1  Sep. 8, 2011

(30) Foreign Application Priority Data

Mar. 8, 2010 (EP) ..................................... 10155719

(51) Int. Cl.
  *H02K 3/50* (2006.01)
  *H02K 3/47* (2006.01)
  *H02K 5/24* (2006.01)
  *H02K 15/04* (2006.01)

(52) U.S. Cl.
  USPC .............................. 310/260; 310/270; 310/91

(58) Field of Classification Search .................. 310/260, 310/270, 85, 91, 214; *H02K 3/50, 3/46, 5/24, H02K 15/04*
  See application file for complete search history.

(56) References Cited

U.S. PATENT DOCUMENTS

| 3,390,862 | A | * | 7/1968 | Schrepfer | 254/104 |
| 4,068,142 | A | * | 1/1978 | Gillet et al. | 310/214 |
| 4,480,287 | A | * | 10/1984 | Jensen | 361/707 |
| 4,488,071 | A | * | 12/1984 | Lane | 310/68 B |
| 4,942,326 | A | | 7/1990 | Butler, III et al. | |
| H0000906 | H | * | 4/1991 | Baggett et al. | 403/409.1 |
| 5,053,663 | A | * | 10/1991 | Boer et al. | 310/91 |
| 6,695,524 | B2 | * | 2/2004 | Monson et al. | 403/374.3 |
| 2002/0125785 | A1 | * | 9/2002 | Kylander et al. | 310/214 |

FOREIGN PATENT DOCUMENTS

FR  7524662  3/1977
GB  2093517  9/1982

OTHER PUBLICATIONS

European Search Report for EP Patent App. No. 10155719.7 (Aug. 6, 2010).

* cited by examiner

*Primary Examiner* — Tran Nguyen
*Assistant Examiner* — Michael Andrews
(74) *Attorney, Agent, or Firm* — Cermak Nakajima LLP; Adam J. Cermak

(57) ABSTRACT

A device (10) for connecting together end winding parts (1) of stator bars (2) of an electric generator includes a first and a second element (11, 12) having sloped facing surfaces (13) defining two trapezoidal seats each housing a trapezoidal cursor (14), and one or two screws (15), axially fixed and rotatably movable with respect to the first and second element (11, 12) and having a threaded portion inserted in a threaded through hole (17) of the cursor (14).

15 Claims, 2 Drawing Sheets

DEVICE FOR CONNECTING TOGETHER END WINDING PARTS OF STATOR

This application claims priority under 35 U.S.C. §119 to European Application No. 10155719.7, filed 8 Mar. 2010, the entirety of which is incorporated by reference herein.

BACKGROUND

1. Field of Endeavor

The present invention relates to a device for connecting together end winding parts of stator bars.

2. Brief Description of the Related Art

Stator bars are known to have straight parts or slot parts that are inserted in slots of the stator, and end winding parts that are usually bent with respect to the straight parts and are electrically connected together.

In particular, with reference to FIG. 1 that shows an end winding part 1 of a stator bar 2, the end winding parts 1 have an involute portion 3 and a terminal straight portion 5.

Connection between adjacent end winding parts 1 is achieved at the terminal straight portions 5 via insulation caps that form the electric connections between the stator bars.

No connection is provided between the involute portions 3 of the end winding parts 1.

Since the end winding parts 1 are only blocked at their terminal straight portions 5, during operation vibrations may be generated.

Vibration may damage connection of the end winding parts 1 to the phase rings and may cause insulation and/or bars to be damaged.

In different embodiments, stator bars may be provided with plastic blocks between the involute portions 3 of the end windings parts 1 for blocking them together.

These plastic blocks typically have a fixed dimension and are provided with holes in which connecting laces are inserted.

Nevertheless, these plastic blocks are not able to firmly connect the end winding parts 1 together, since during operation forces generally loosen the laces, such that firm connection is lost and, also in this case, vibrations may be generated.

SUMMARY

One of numerous aspects of the present invention includes a device by which the aforementioned problems of the known art are addressed.

Another aspect of the present invention includes a device that is able to firmly block end winding parts of stator bars together, with no or only limited risk that, during operation, firm connection is lost.

Another aspect includes a device that, during operation of an electric generator, prevents vibration generation.

Advantageously, use of the devices embodying principles of the present invention to connect together the end winding parts of the stator bars allows the reliability of the generator to be increased.

BRIEF DESCRIPTION OF THE DRAWINGS

Further characteristics and advantages of the invention will be more apparent from the description of a preferred but non-exclusive embodiment of the device according to the invention, illustrated by way of non-limiting example in the accompanying drawings, in which.

DETAILED DESCRIPTION OF EXEMPLARY EMBODIMENTS

Figure 1:
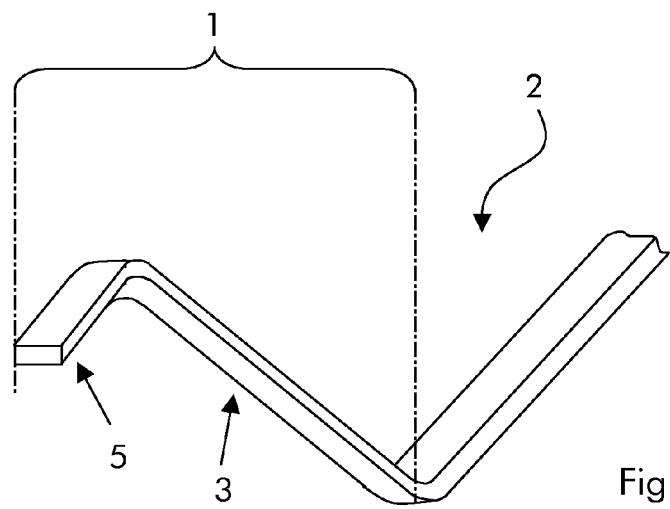
FIG. 1 is a schematic view of an end winding part of a stator bar.

With reference to the figures, a device 10 for connecting together end winding parts 1 of stator bars 2 of an electric generator is illustrated. In particular, the device 10 is arranged for stiffening the end winding parts of a generator.

The device 10 includes a first and a second element 11, 12 that are movable apart from one another to regulate the device dimension, to perfectly fit a gap between adjacent end winding parts.

In particular, the first and second element 11, 12 have sloped facing surfaces 13 defining trapezoidal seats housing trapezoidal cursors 14.

In addition, screws 15 are axially fixed (i.e., along a longitudinal axis 16) and rotatably movable with respect to the first and second element 11, 12 and have threaded portions inserted in threaded through holes 17 of the cursors 14.

In particular, as shown in the figures, the first and second element 11, 12 have sloped facing surfaces 13 defining two trapezoidal seats, and one cursor 14 is housed in each trapezoidal seat.

The trapezoidal seats converge towards the other trapezoidal seat, i.e., the trapezoidal seats have the smaller basis that faces the other trapezoidal seat.

In addition, the two trapezoidal seats are aligned along the longitudinal axis 16 of the device.

The screws 15 have a guide portion 18 (defined by a disk with a diameter larger than the diameter of the screw) housed in recessed seats 19 of the first and second element 11, 12.

Figures 2, 3:
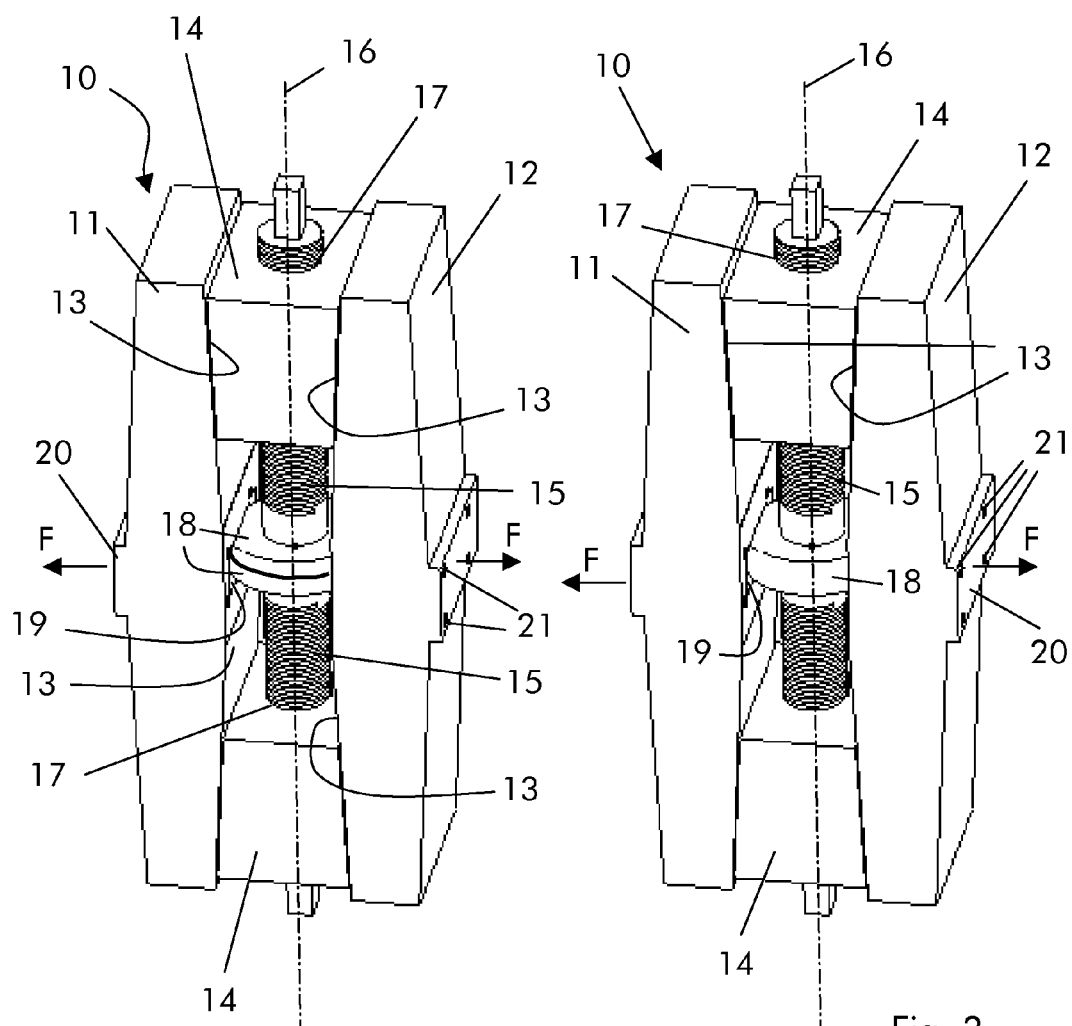
FIGS. 2 and 3 are two different embodiments of a device of the invention.
Figure 4:
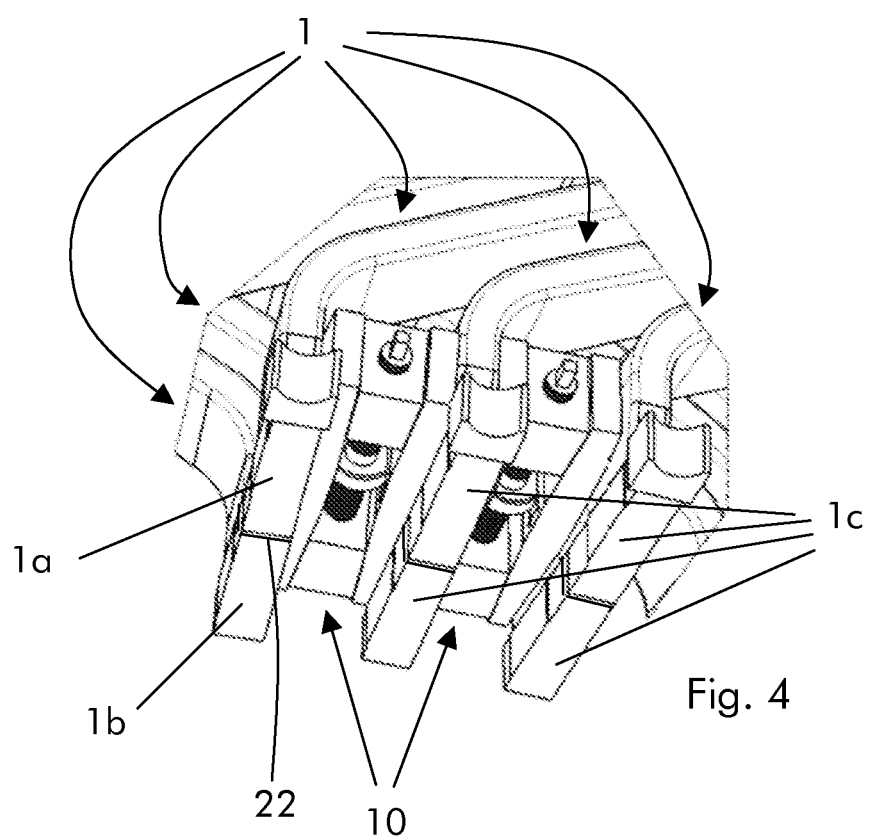
FIG. 4 is an example of devices connected to the end winding parts of stator bars; in this figure the insulation caps connecting together two adjoining end winding parts are not shown.

In particular, FIG. 3 shows an embodiment in which one single screw 15 is provided; this screw 15 is inserted in the threaded through holes 17 of both cursors 14 and it is also provided with the guide portion 18 located centrally, that is slidingly inserted in the recessed seats 19 of the first and second element 11, 12.

In this embodiment, one of the holes 17 is right-hand threaded and the other is left-hand threaded and the screw 15 has corresponding threaded portions.

FIG. 2 shows an embodiment similar to the one already described and in which like reference numbers identifies similar components; in addition, in this embodiment, one screw 15 is inserted in the treated through hole 17 of each cursor 14, such that two screws 15 are provided. Preferably, also in this embodiment, one of the holes 17 of the cursors 14 is right-hand threaded and the other is left-hand threaded and the screws 15 have corresponding threaded portions.

In this embodiment, the two screws 15 are operable independently from one another and each of them has the guide portion 18 housed in the recessed seats 19 of the first and second element 11, 12.

In particular, the two guide portions 18 of the two screws 15 are housed in the same seats 19 of the first and second element 11, 12.

Preferably the outer surfaces of the first and second elements 11, 12 are padded, i.e., they are provided with soft pad, for example made of fiberglass (not shown).

The first and second element 11, 12 also have outer surfaces provided with ribs 20 insertable between adjoining end winding parts 1 when the devices 10 are mounted on an electric generator.

The ribs are preferably provided with holes 21 that allow the device to be secured, for example by cords.

Moreover the device 10 is made of insulating material and, thus, in particular, the first and second element 11 and 12, the screws 15 and the cursors 14 are made of an insulating material such as plastic or GRP or glass fibers embedded in a plastic matrix, and so on.

In addition in order to keep the first and second element 11, 12, the cursors 14 and the screws 15 together, appropriate devices are provided. For example, connecting elements between the first and second element 11, 12 or dove-tale connections between the sides of the cursors 14 and the surfaces 13 or also other appropriate structures are provided.

The operation of the device is apparent from that described and illustrated and is substantially the following.

Initially the cursors 14 are in position apart from the center of the device 10, such that the width of the device 10 is small and it can be inserted between the end winding parts 1.

When the devices 1 are inserted between the end winding parts 1, the ribs 20 are placed in the slits 22 between adjoining end winding parts 1a, 1b. It is anyhow clear that when needed the devices 10 can also be located between the insulation caps.

When in position, the screws 15 are screwed, such that the cursors 14 advance towards the center of the device 10 and the first and second element 11 and 12 move apart from one another, as indicated by arrows F of FIGS. 2 and 3, to block the end winding parts 1 together.

Thus securing devices, such as adhesive or resin-impregnated cords, are provided in order to block the screws 15.

The embodiment shown in FIG. 2 is particularly advantageous, since regulation of each screw 15 is possible independently from the other; in other words, when regulating the device 10, the first and second element 11 and 12 need not be parallel one to the other, but they may also rotate to perfectly fit the gap between the adjacent end winding parts 1c.

When mounting the devices different configurations are possible.

For example a device may be inserted every gap, or every other gap, or only in positions where large vibration are measured during tests or calculations. In addition, the number of devices connected on a generator can be reduced by connecting a device 10 every second connection between end winding parts; the other connections can be achieved through blocks having fixed dimensions.

Naturally the features described may be independently provided from one another.

The materials used and the dimensions can be chosen at will according to requirements and to the state of the art.

Reference Numbers
1 end winding parts
1a, b adjoining end winding parts
1c adjacent end winding parts
2 stator bar
3 involute portion of 2
5 terminal straight portion of 2
10 device
11 first element
12 second element
13 surfaces of 11, 12
14 cursors
15 screws
16 longitudinal axis
17 threaded through holes of 14
18 guide portions of 15
19 recessed seats of 11, 12
20 ribs
21 holes of 20
22 slits
F direction of movement of 11, 12

While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

We claim:

1. A device for connecting together end winding parts of stator bars of an electric generator, the device comprising:
    a first element and a second element movable apart from one another to regulate a device dimension;
    a trapezoidal cursor having a threaded through hole;
    at least one screw axially fixed and rotatably movable with respect to the first and second elements, the at least one screw having a threaded portion inserted in the threaded through hole of the cursor;
    wherein said first and second elements have sloped facing surfaces defining at least a trapezoidal seat, the trapezoidal cursor being positioned in the trapezoidal seat;
    wherein the first and second elements have sloped facing surfaces defining two trapezoidal seats;
    wherein the trapezoidal cursor is a first trapezoidal cursor, and further comprising a second trapezoidal cursor;
    wherein one of said first and second cursors is housed in each of said two trapezoidal seats; and
    wherein the at least one screw comprises two screws, each of said two screws being inserted in the threaded through hole of each cursor, the two screws being operable independently from one another.

2. A device as claimed in claim 1, wherein each trapezoidal seat converges towards the other trapezoidal seat.

3. A device as claimed in claim 2, wherein the two trapezoidal seats are aligned along a longitudinal axis of the device.

4. A device as claimed in claim 1, further comprising:
    recessed seats in the first element and in the second element;
    wherein said at least one screw has a guide portion housed in the recessed seats of the first and second elements.

5. A device as claimed in claim 1, wherein the at least one screw is a single screw, the single screw being inserted in the threaded through holes of both cursors.

6. A device as claimed in claim 1, further comprising:
    recessed seats in the first element and in the second element;
    wherein each screw has a guide portion housed in a recessed seat of the first and second elements.

7. A device as claimed in claim 6, wherein the guide portions of both screws are housed in the same seats of the first and second elements.

8. A device as claimed in claim 1, wherein said first and second elements have outer surfaces including ribs which are configured and arranged to be insertable between adjacent end winding parts.

9. A device as claimed in claim 8, wherein the ribs comprise holes configured and arranged to allow the device to be secured.

10. A device as claimed in claim 1, wherein said first and second elements, said at least one screw, and said cursor are made of an insulating material.

11. A device as claimed in claim 1, further comprising:
securing means for blocking the at least one screw.

12. A device as claimed in claim 11, wherein the securing means comprises adhesive or resin-impregnated cords.

13. An assembly useful in the stator of an electric generator, the assembly comprising:
at least two adjacent stator bars, each of the at least two adjacent stator bars including an end winding part and an insulation cap; and
a device as claimed in claim 1 positioned between the end winding parts or between the insulation caps of the at least two adjacent stator bars.

14. An assembly as claimed in claim 13, wherein:
the first and second elements have outer surfaces including ribs;
each of the end winding parts include a slit; and
each of the ribs is positioned in one of the slits.

15. An electric generator comprising:
a stator including stator slots; and
an assembly as claimed in claim 13 positioned at least partially in the stator slots.

* * * * *